Jan. 6, 1942.  H. A. FARRAND  2,269,364
COLLAPSIBLE STRUCTURE
Filed July 5, 1940 13 Sheets-Sheet 1

Inventor:
Hiram A. Farrand
by his Attorneys
Howson & Howson

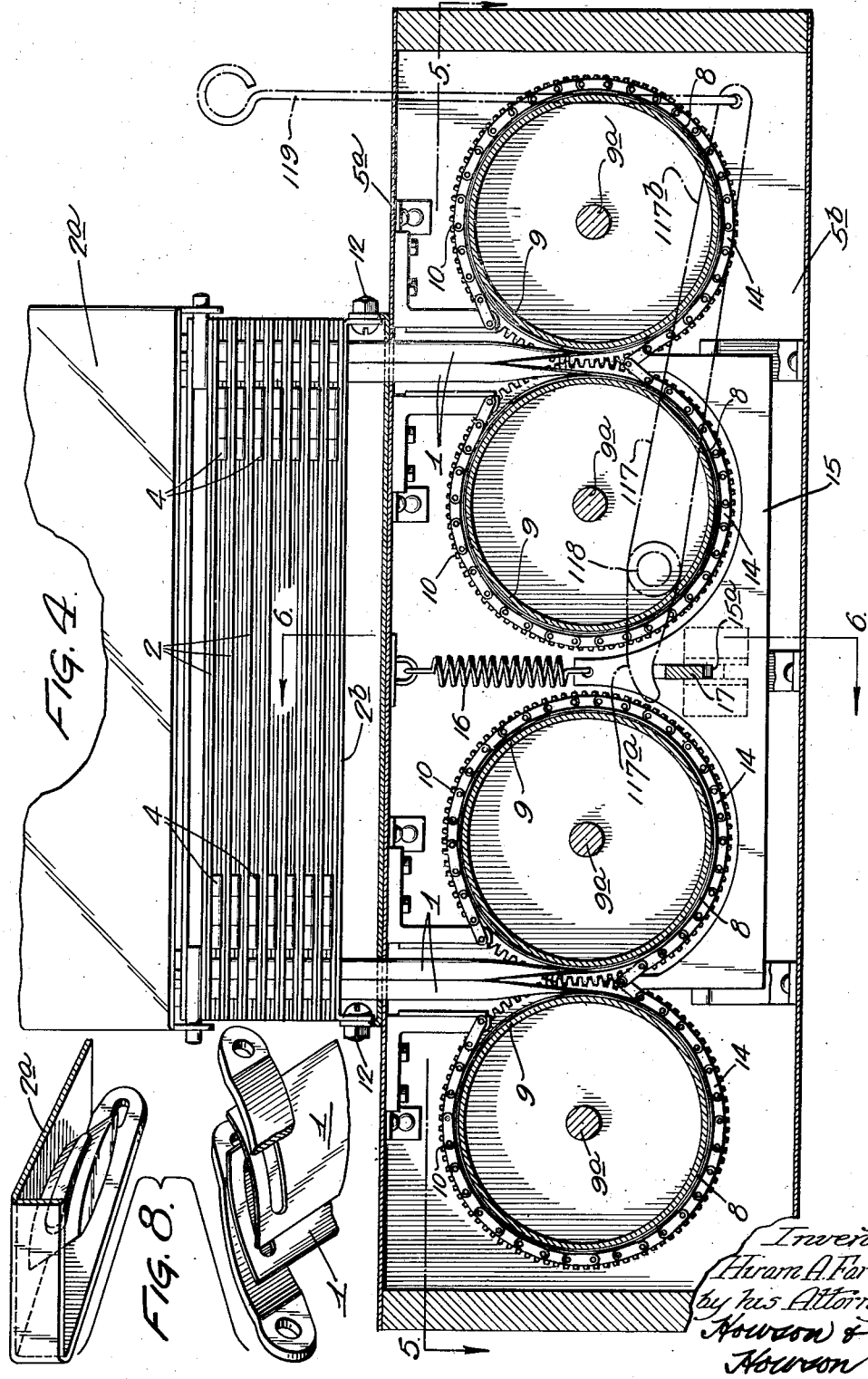

Jan. 6, 1942.                H. A. FARRAND                 2,269,364
                         COLLAPSIBLE STRUCTURE
                         Filed July 5, 1940            13 Sheets-Sheet 3
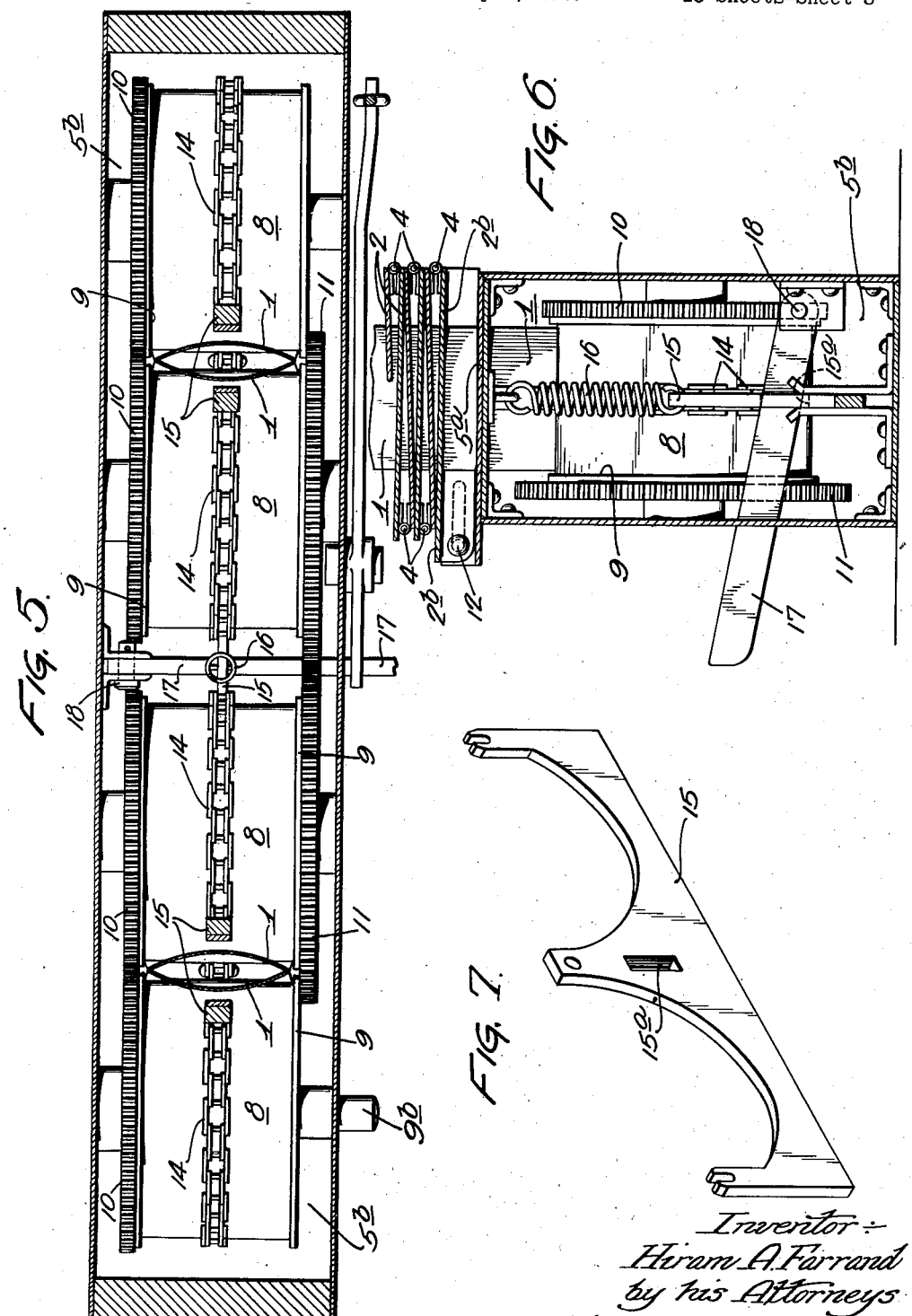

Jan. 6, 1942.  H. A. FARRAND  2,269,364
COLLAPSIBLE STRUCTURE
Filed July 5, 1940  13 Sheets-Sheet 4
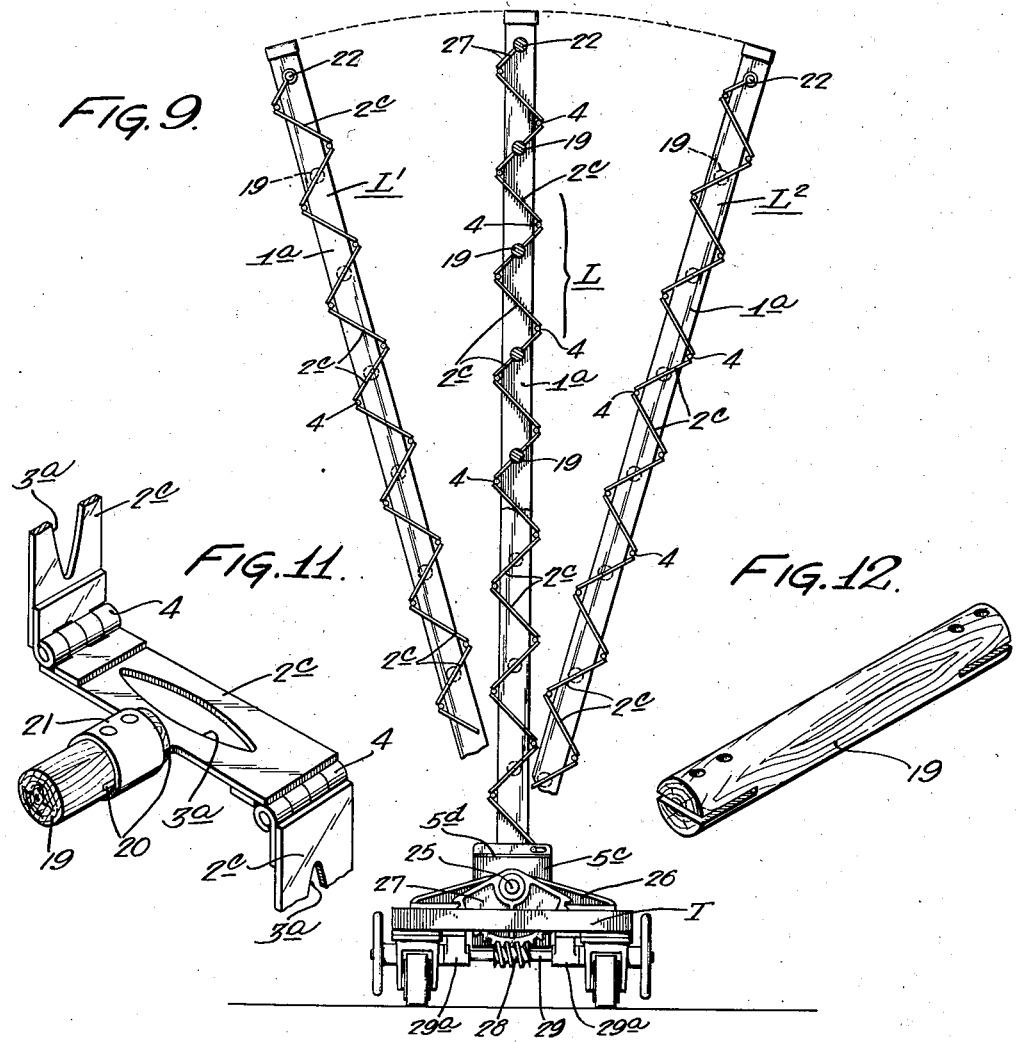
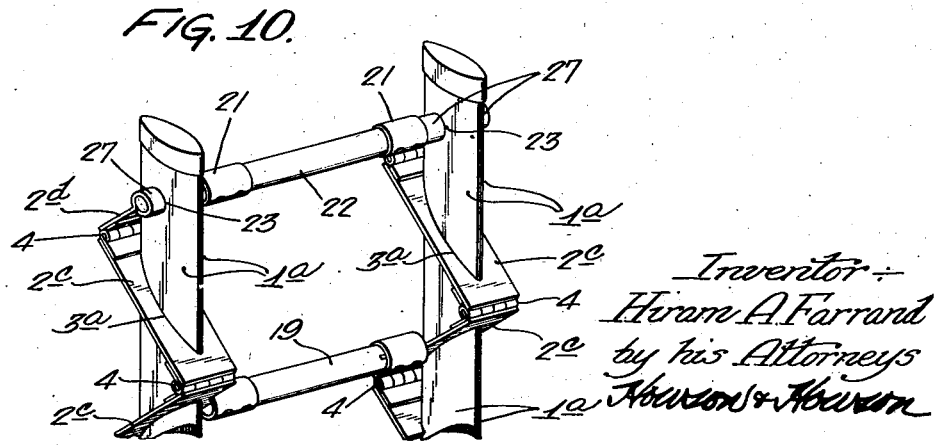
Inventor:—
Hiram A. Farrand
by his Attorneys Jan. 6, 1942.   H. A. FARRAND   2,269,364
COLLAPSIBLE STRUCTURE
Filed July 5, 1940   13 Sheets-Sheet 5
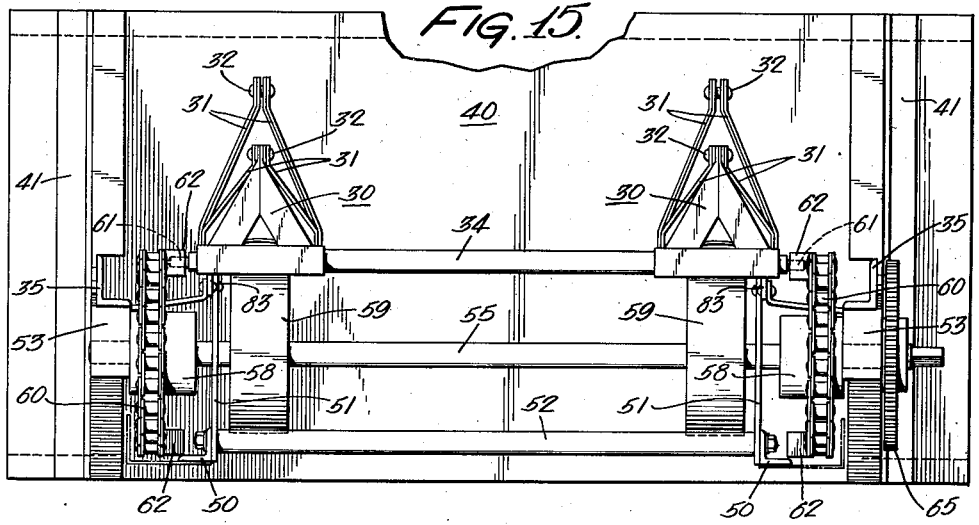
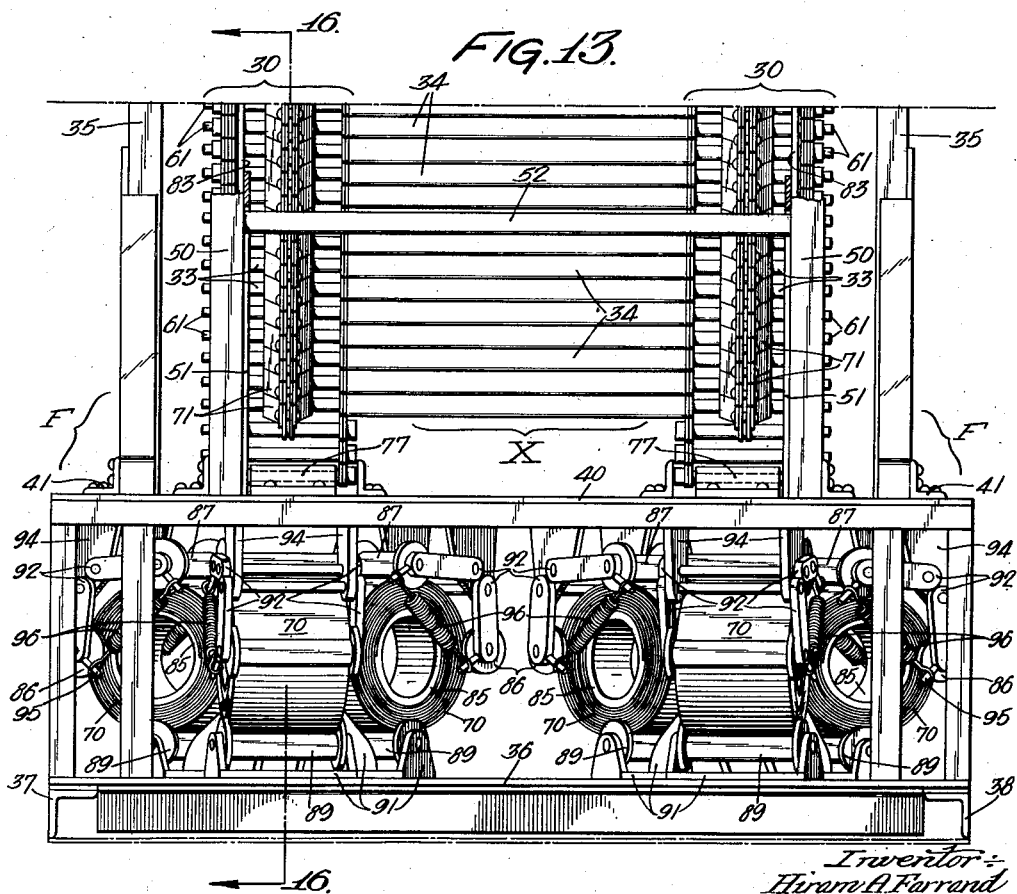

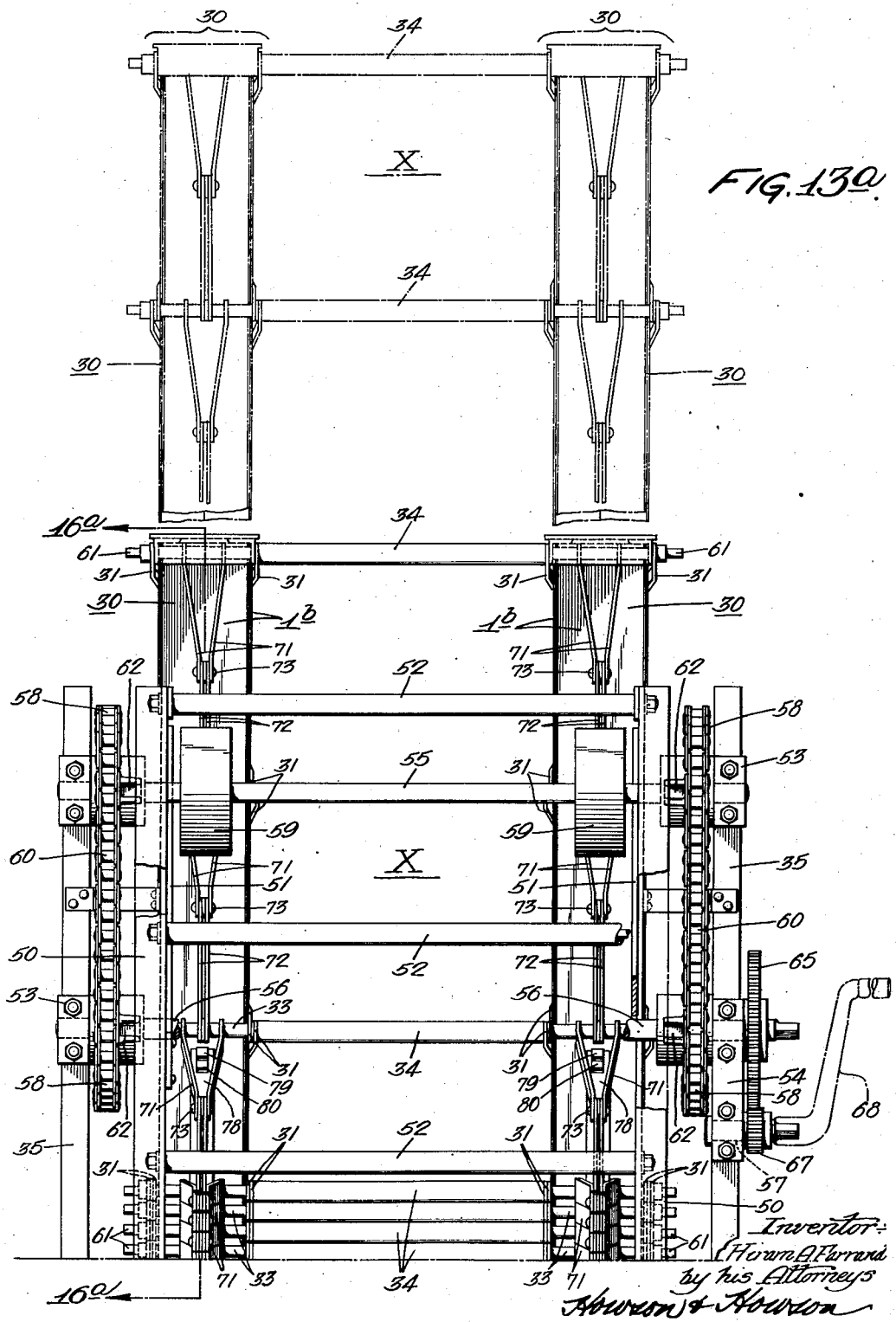

Jan. 6, 1942.   H. A. FARRAND   2,269,364
COLLAPSIBLE STRUCTURE
Filed July 5, 1940   13 Sheets-Sheet 7

Inventor:
Hiram A. Farrand
by his Attorneys
Howson & Howson

Jan. 6, 1942.     H. A. FARRAND     2,269,364
COLLAPSIBLE STRUCTURE
Filed July 5, 1940     13 Sheets-Sheet 9

Inventor:
Hiram A. Farrand
by his Attorneys
Howson & Howson

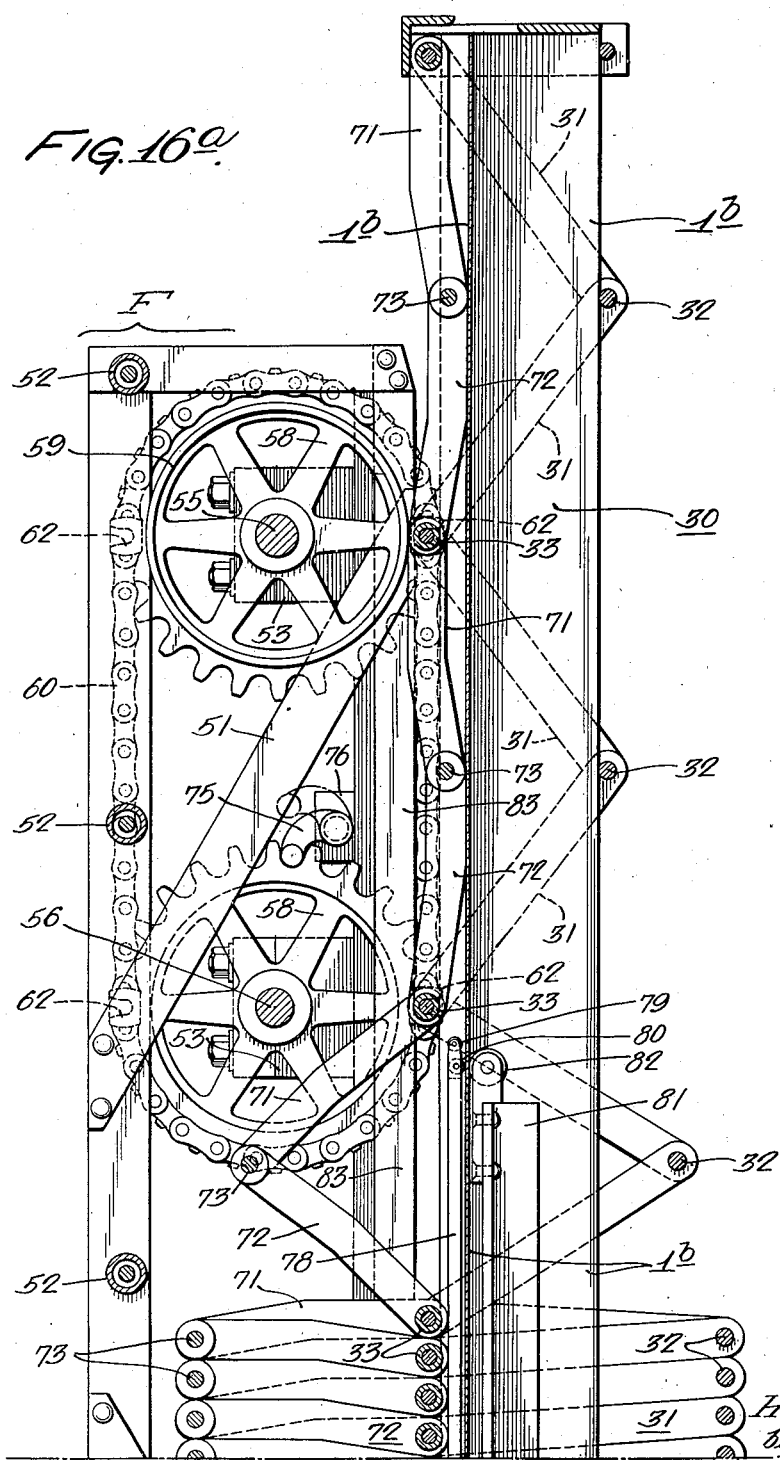

Jan. 6, 1942.  H. A. FARRAND  2,269,364
COLLAPSIBLE STRUCTURE
Filed July 5, 1940   13 Sheets-Sheet 11

Inventor:
Hiram A. Farrand
by his Attorneys

Jan. 6, 1942.                H. A. FARRAND                2,269,364
                         COLLAPSIBLE STRUCTURE
                         Filed July 5, 1940        13 Sheets-Sheet 13

Patented Jan. 6, 1942

2,269,364

UNITED STATES PATENT OFFICE 2,269,364

COLLAPSIBLE STRUCTURE

Hiram A. Farrand, Berlin, N. H.

Application July 5, 1940, Serial No. 344,149

12 Claims. (Cl. 228—41)

This invention relates to collapsible structures and particularly to a specific form of device embodying principles disclosed in my copending application, Serial No. 262,324, filed March 16, 1939.

The present invention relates to a collapsible stairway or ladder having horses or side rails composed of collapsible beam structures or columns of the kind disclosed in the above noted copending application, with suitable steps or rungs connecting two laterally spaced collapsible beams or columns and arranged to assume compact relationship when and as the side columns are contracted, and to assume a spaced stepped relationship when and as the side columns are extended.

One object of the present invention is to provide a step structure, either in the form of a stairway with closed treads and risers or a ladder with spaced rungs, which normally will fold or collapse into a relatively small compact space and which may be extended to reach to any desired elevation above the plane on which the device is supported, within the range of extensibility of the particular device at hand.

Another object of the invention is to provide a collapsible staircase for ascending into attics, lofts or other chambers where a permanent stairway is either undesirable or impractical or would take up space in a passageway, etc. which could be used to better advantage.

Another object of the invention is to provide a collapsible ladder which can be compactly stored on a truck, for example, for movement in and through restricted places, such as machine shops, factories, warehouses, etc. where the aisles are narrow and the machines or other equipment or piles of merchandise etc. are high, and where it is necessary to climb aloft to inspect or adjust line shafting, lighting equipment, sprinkler heads, valves etc., and where the restricted passageways at and above the floor make it extremely difficult, if not impossible to maneuver a long rigid ladder into position.

In the accompanying drawings:

Fig. 4 is a transverse sectional view of one form of supporting structure and operating mechanism for the collapsible stairway adapted to be enclosed within the storage receptacle of Figs. 1 and 3;

Fig. 5 is a sectional plan view on line 5—5, Fig. 4;

Fig. 6 is a sectional view taken on the line 6—6 of Fig. 4;

Fig. 7 is a detached perspective view of a brake bar employed to aid in the control of the metal strips when wound upon the drums;

Fig. 8 shows a detail of the top tread of the stair and means for connecting it to the upper ends of the collapsible side rails or horses of the stairway;

Fig. 9 is a side view of a modified collapsible structure in the form of an extension ladder storage receptacle and operating mechanism mounted on a truck for transport;

Fig. 10 is a perspective view of the upper portion of the extension ladder shown in Fig. 9;

Fig. 11 is a perspective view of one of the structural brace and rung supporting elements employed in the construction of the side rails of the ladder shown in Fig. 9;

Fig. 12 illustrates one of the rungs of the ladder;

Figure 17:
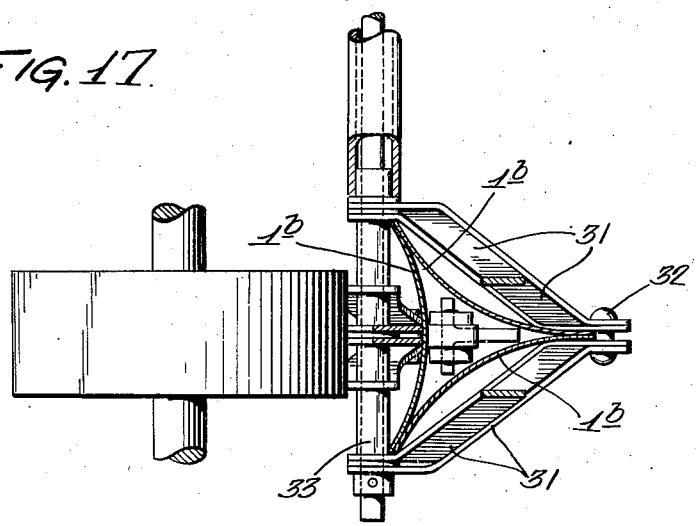
Figure 14:
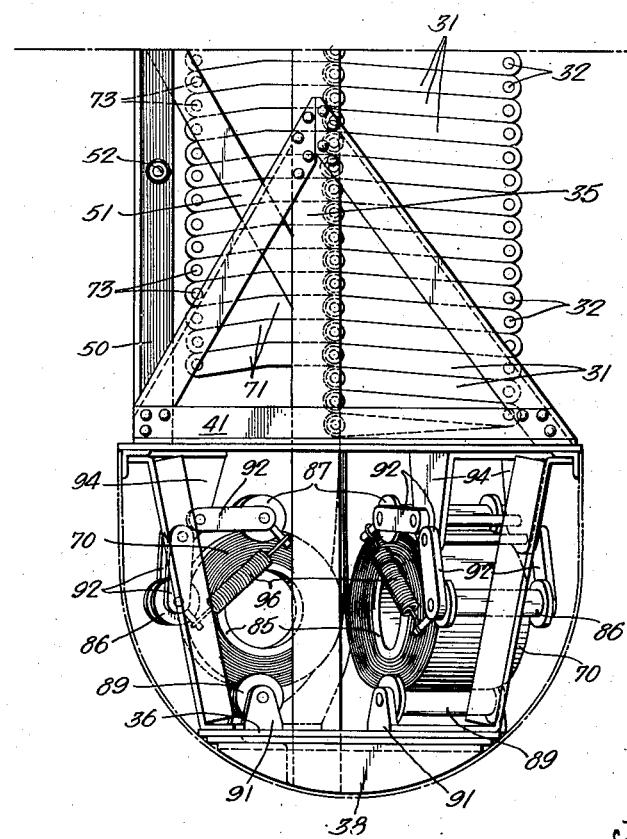
Figure 14A:
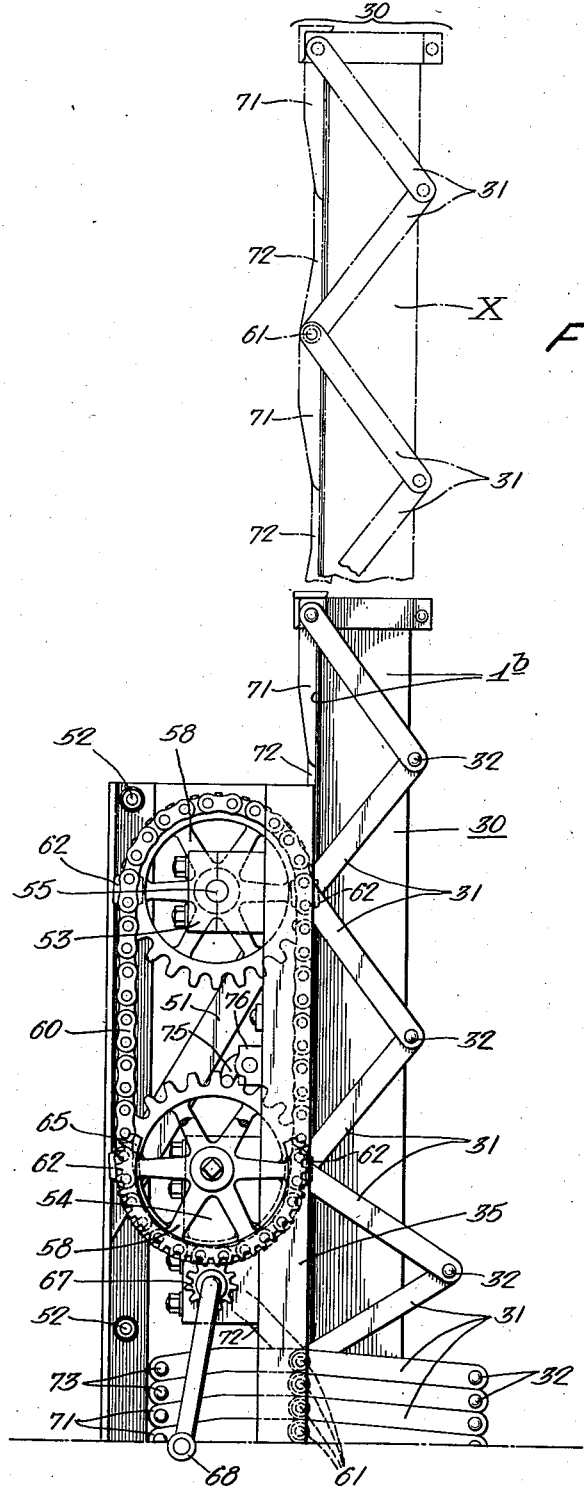
Figure 16:
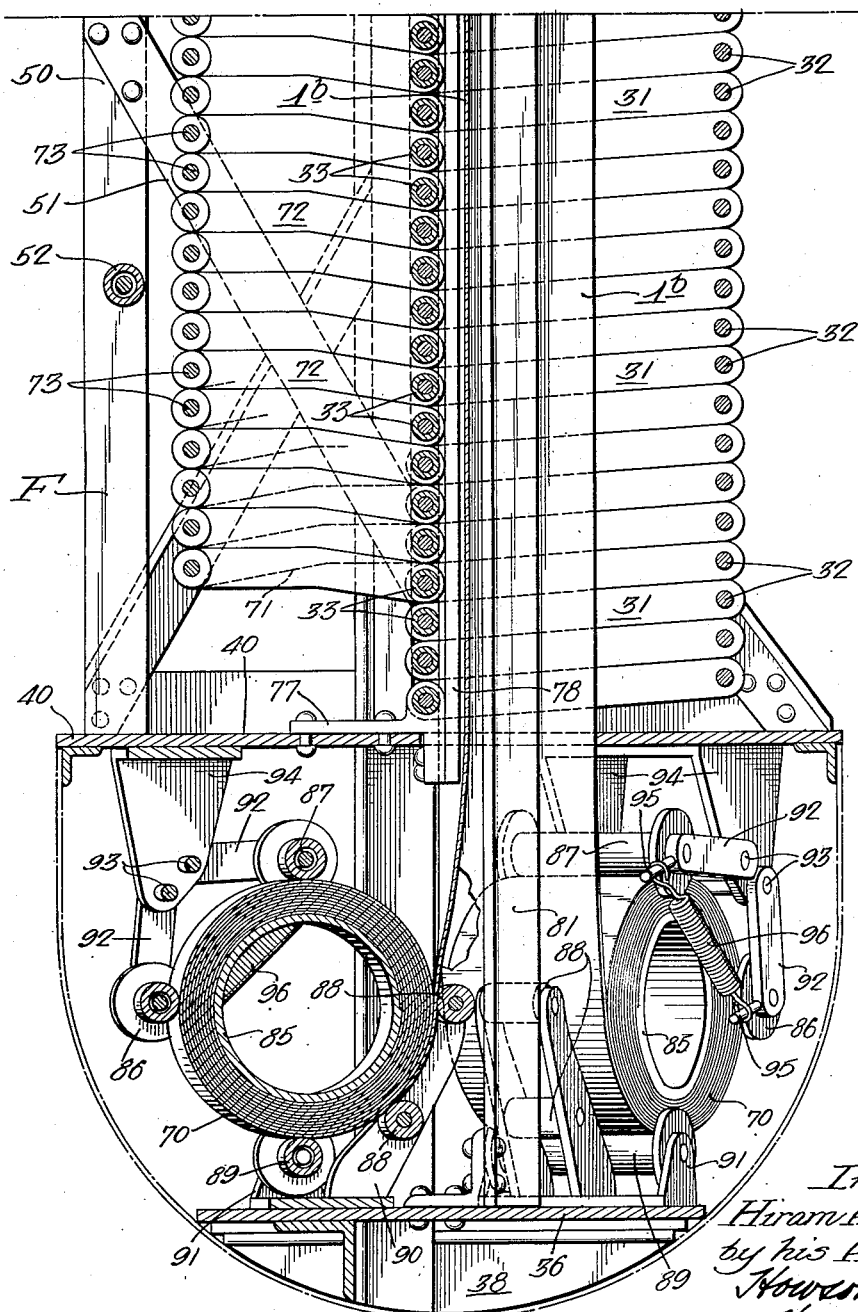
Figure 18:
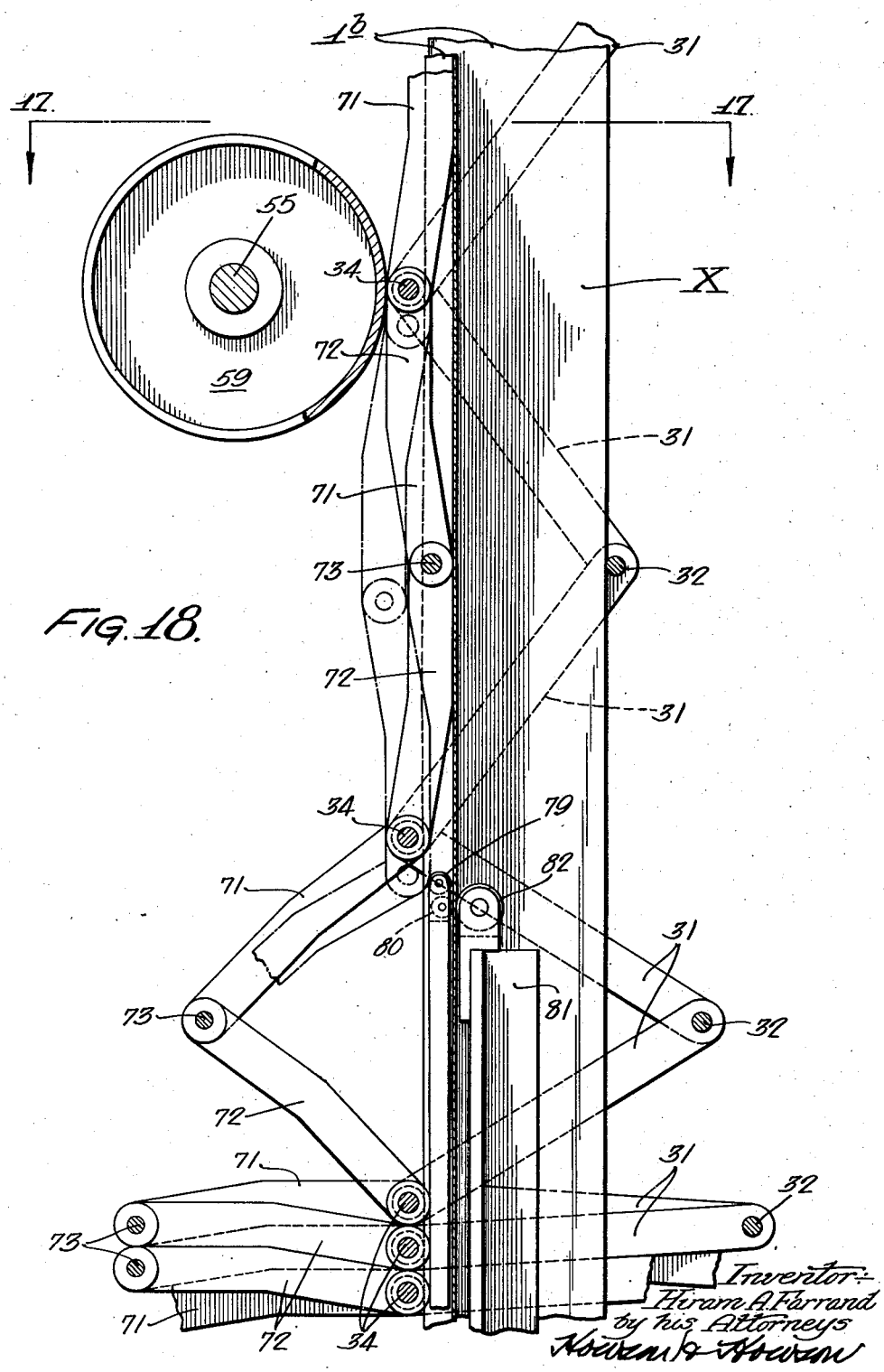
Figure 19:
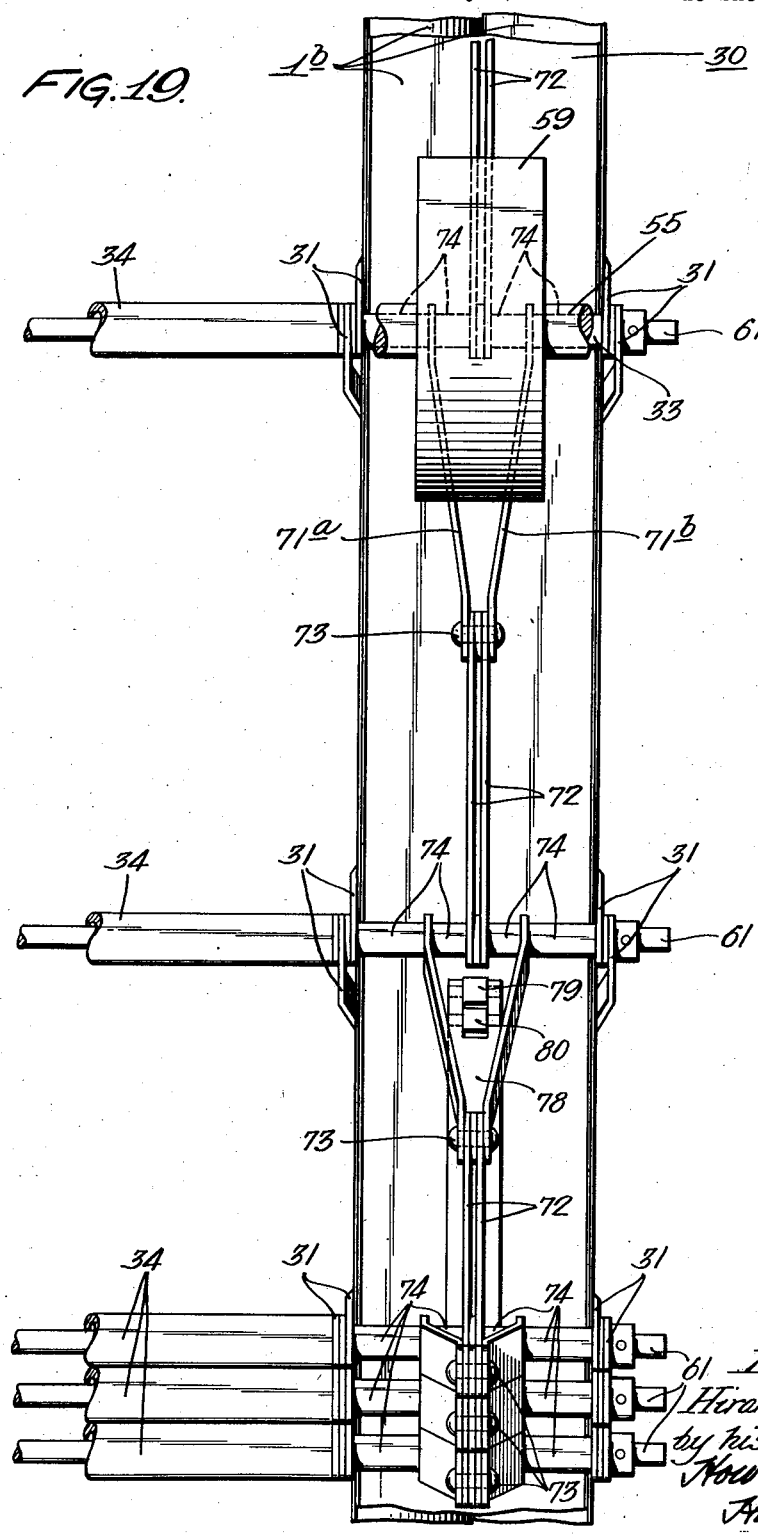

Figs. 13–13a constitute a front view showing another type of collapsible structure applicable for use as a ladder, or tower, capable of variable longitudinal extensibility;

Figs. 14–14a constitute a side view of the structure of Figs. 13–13a;

Fig. 15 is a plan view of the structure shown in Figs. 13–13a and 14–14a;

Figs. 16–16a constitute an enlarged longitudinal sectional view through one of the side rails, or columns, of the structure of Figs. 13–13a, as viewed from line 16—16, Fig. 13, and line 16a—16a, Fig. 13a;

Fig. 17 is a sectional plan view of one of the side rails as viewed from line 17—17 of Fig. 18;

Fig. 18 is an enlargement of certain details shown in section in Fig. 16a;

Fig. 19 is a front view of the mechanism shown in Fig. 18; and

Figure 20:
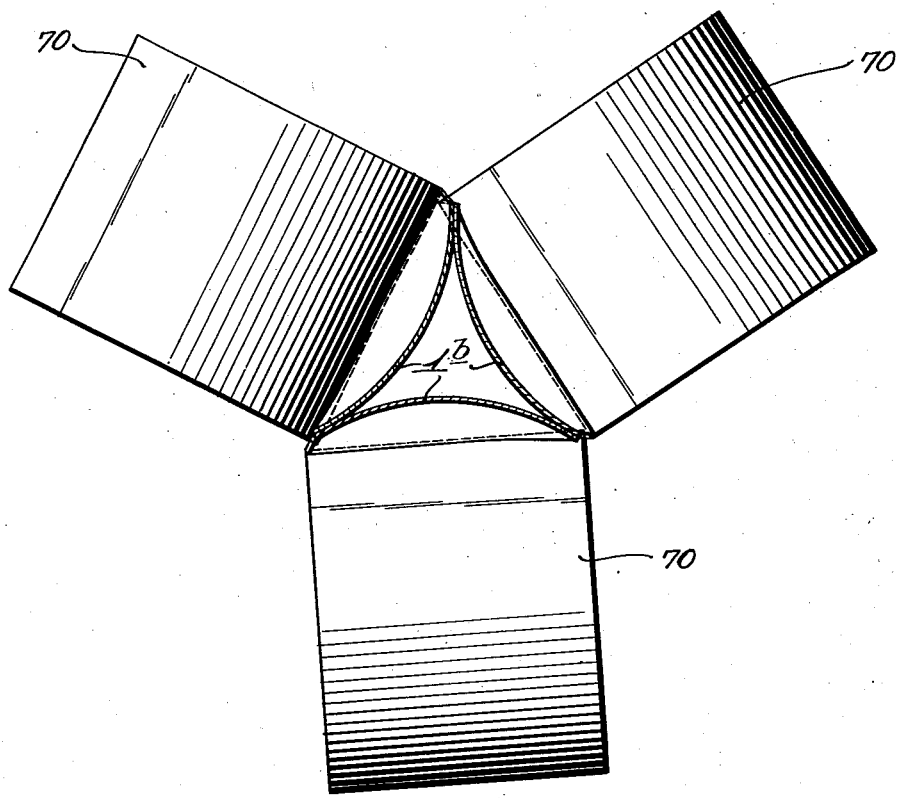

Fig. 20 is a diagrammatic plan view illustrating the relative locations of the strip elements of the side rails when in extended column and as coiled beneath.

The structure shown in the Figs. 1 to 8 inclusive, is that of a collapsible stairway S employed to give access between the floors of a building where permanent access is not supplied or desired, as between an upper floor and an attic or loft overhead.

In Figs. 1 to 8 inclusive the numeral 1 designates a flexible strip of resilient material such as tempered steel, bronze, etc. The shape of each strip 1 is normally rectilinear longitudinally and bent or non-planar transversely. These strips, however, are adapted to be bent longitudinally and thereby assume a planar condition transversely; and while a strip may be bent out of its normal rectilinear state it inherently retains at all times a tendency to assume its normal longitudinally-straight, transversely-curved shape.

Figure 2:
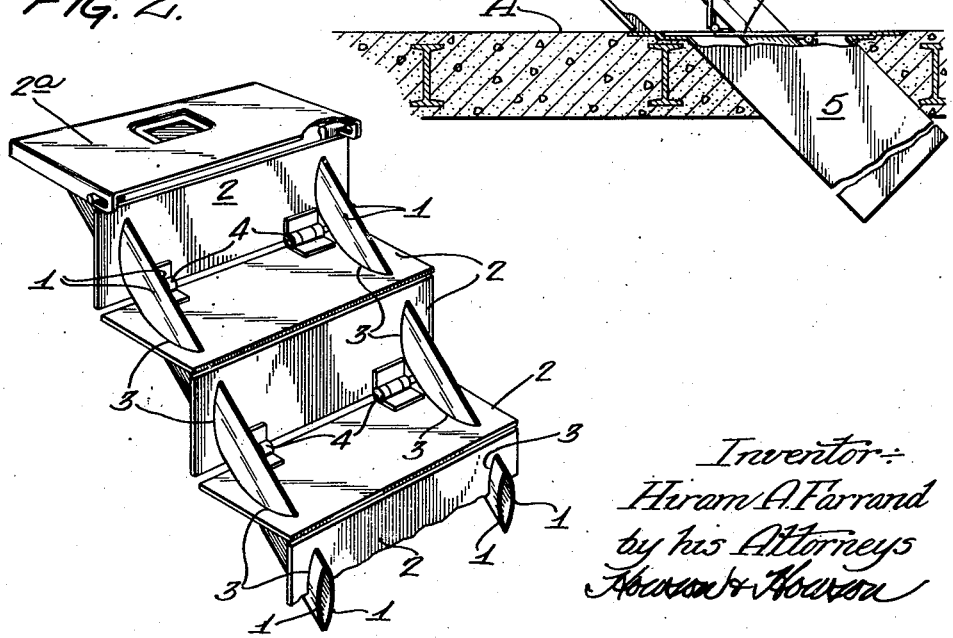
Fig. 2 is a perspective view of an upper portion of the stairway shown in Fig. 1.

In Figs. 2, 6 and 10 the spring strips 1, 1 are shown assembled in pairs, with the concaved surfaces of each pair facing inward toward one another. Two sets of such paired strips are shown, each set forming a longitudinal side rail member or horse of the stair-like structure S.

Figure 1:
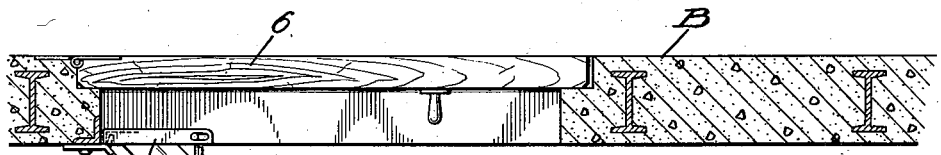
Fig. 1 is a side view of a collapsible structure of stair-like form for use between two floors of a building.

The steps of the stairway structure S consist, as shown in Figs. 1 and 2, of a number of plates 2, 2, which constitute the treads and risers of the steps. The step plates 2, 2 are arranged in a series along the length of the longitudinal strips 1, 1.

Each of the step plates 2 is provided with two transversely elongated openings 3, 3, one near each end of the plate through which the pairs of strips 1, 1 are threaded. The plates 2, 2 are joined together along their side edges by hinges 4, 4 in such a manner that they may fold back and forth, one upon another, accordion like.

When the collapsible structure is extended, the step plates 2, 2 are disposed along the longitudinal pairs of strips in a zigzag formation. However, when the structure is collapsed the plates 2, 2 are folded down one upon another. When stretched out over the lengths of strips 1, 1 the plates 2, 2 form a series of treads and risers as shown in Figs. 1 and 2. Fig. 1 shows the entire series of step plates 2, 2, stretched out over the full length of the pairs of strips 1, 1, to form the complete stairway S connecting the two floor levels A and B respectively.

The upper floor B is shown as being provided with a trap door 6, which may be lifted to gain access to the upper room. Hidden away beneath the surface of the lower floor A is a storage receptacle 5 which is adapted to be covered over by a trap door 7. The door 7 is shown as being raised to permit movement of the stairway toward the ceiling, in Fig. 3. The entire structure formed by the strips 1, 1 and step plates 2, 2, when retracted, is adapted to be stowed away in the receptacle and covered by the trap door 7.

Fig. 4 shows the mechanism employed to coil the strips 1, 1 and to assemble the step plates 2, 2 compactly for storage within the receptacle 5. The tread and riser plates 2, 2 are shown as being folded, one over the other, in succession upon a platform 5a forming the top of a compartment 5b which may be built into the receptacle 5 or removably mounted therein to hold winding mechanism, by which the strips are wound into coils 8, 8 on drums 9, 9.

The reel drums 9, 9 are located in the compartment 5b below the points where the longitudinal pairs of strips 1—1 and 1—1 project down into the compartment 5b through suitable openings in the platform 5a, in such position that each drum 9 receives one strip 1 which is attached thereto. The shafts 9a, 9a of each pair of drums 9, 9, adjacent one of the side walls of the compartment 5b are provided with spur gears 10, 10 which mesh with one another, so that the movements of adjacent drum surfaces are in the same direction and operate at equal speeds. The shafts 9a, 9a of the two middle drums are provided with a second pair of spur gears 11, 11 which mesh with one another and operate to move all four drums at equal speeds and in such directions that the strips 1—1 and 1—1 are all drawn into the coil 8, 8 or unwound therefrom at the same time and rate.

The several strips 1 are connected at their upper extremities to the topmost step plate 2a (see Figs. 4 and 8) and upward movement of the strips 1, 1, carries the top step plate 2a upwardly as the strips 1, 1 unwind from the drums 9, 9 below. As all of the step plates are connected by the hinges 4, 4 at their adjacently disposed edges, the step plates unfold and follow in succession as the strips 1, 1 continue upwardly. The bottom step plate 2b is connected at its lower edge to the platform 5a of the compartment 5b by hinge bolts 12, 12, so that ultimately, when the entire series of step plates 2, 2a, 2b is drawn out into combination with the strips 1, 1, and each pair of strips 1, 1 is firmly embraced by the elongated elliptical openings 3, 3 in the step plates, the movement of the strips 1, 1 is arrested.

When the composite formation providing the flight of steps is complete and the top step 2a is resting on a projection 13 at the ceiling above the floor A from which the stairway is projected, the stairway S is ready to bear the weight of a person desiring to climb to the floor B of the upper room or loft.

It is to be noted that by reason of the inherent tendency of the strips 1, 1 to straighten out into their normal straight longitudinal shape these strips act, automatically, to unwind, lift, extend and unfold the structure to its fullest extended position, provided of course, the total load carried by the strips 1, 1 is not in excess of the combined tensions of the strips.

As illustrated in Figs. 4, 5 and 6 each drum 9 and its coiled strip 1 is held in the clasp of a flexible retaining device, which in the case shown is a chain 14 preferably of the kind used for driving sprocket wheels. The chains 14, 14 are arranged to surround substantially all or at least a large portion of the circumference of the drums 9, 9, and the coils 8, 8 respectively wound thereon. The purpose of the chains 14, 14 is to act both as retainers and as brakes. When a strip 1 is wound in a coil 8 on a drum 9 the inherent tendency of the strip is to unwind and straighten out. When such a coil is released and permitted to move with the projected end of the strip suitably guided it will turn the drum in an unwinding direction and force the free end out into a straight direction.

Each of the chains 14, 14 is normally held in tight contact with the outside convolution of the coil 8 and held under pressure there by means of the bar 15, which is actuated by a spring 16 suspended from the platform 5a. The chains 14 operate as brakes to hold the drums 9 and coils 8 stationary or to retard their motion.

Release of the brake bands formed by the chains 14 is brought about through a lever 17. This lever is fulcrumed on a pin 18 located at the rear wall of the compartment 5b. This lever, as shown, passes through a rectangular opening 15a located midway of the brake bar 15 so that pressure on the outer end (which emerges through the front of the compartment) results in releasing pressure on the coils 8 and permits the drums 9 to turn in either direction to change the degree of extension of the stairway structure S above the compartment 5b.

Since the spring strips 1, 1 will unwind automatically when released, it is necessary in order to effect collapse of the stairway structure, to apply sufficient extraneous force in opposition to the straightening tendencies of the spring strips 1, 1 to overcome the force exerted by the strips in extending the structure outwardly from the compartment 5b. This may be brought about directly by overloading the superstructure and thereby forcing the structure down toward the top 5a of the compartment 5b, or by attaching a hand crank or other power driven means to one end of one of the drum shafts 9a which may be lengthened, as at 9b to extend beyond the walls of the compartment. In winding the strips 1, 1, into the coils 8, 8 the strips 1, 1 are drawn down into the compartment 5b as the step plates 2, 2 are collapsed and deposited one after the other upon the platform 5a at the top of the receptacle 5b.

It is to be noted that in case the tension of all of the spring strips 1, 1 proves insufficient to raise the entire superstructure to full height, outside force may be applied to augment the strength of the spring strips 1, 1. This may be accomplished by simply pulling up on the step structure, or by rotating the drums 9, 9 and their coils in the unwinding direction by means of a crank or other means to assist the automatic action of the spring power stored in the coiled strips 1.

Figs. 9, 10, 11 and 12 illustrate another type of extensible and collapsible structure which is in the form of a ladder L. As in the stairway structure described above, the extension ladder form employs two longitudinal members composed of pairs of flexible non-planar strips 1a, 1a. Like in the former structure, the strips 1a, 1a are placed with their concaved surfaces face to face, forming a hollow tube of elongated elliptical cross section. Surrounding each pair of strips is a series of plates 2c quite similar to the plates 2, 2a, 2b employed in the above described structure, except the plates 2c, 2c are relatively narrow and have but one gripping orifice 3a apiece. Each series of gripper plates 2c is associated with one pair of strips 1a, 1a only. The arrangement of plates 2c, 2c along the length of each pair of strips 1, 1 is the same also as that of the plates 2, 2 supra. The two columns are spaced apart laterally and located parallel to one another, and are connected by rungs 19, 19.

Midway of the length of alternate plates 2c are extensions 20 which point inwardly toward the opposite sides of the structure, to receive the ends of the rungs 19. Each rung is slotted at each end to receive the plate extension 20 of the plates 2c. A collar or ferrule 21 is fitted snugly over the rung-end and the three parts are firmly riveted together. In this manner the side rails 1, 1 are securely joined and laterally braced.

The structure L of Figs. 9, 10 and 11 is practically the same as the structure S shown in Figs. 1 to 8 inclusive, except that the central portions of the steps are supplanted by the ladder-rungs to take the place of the series of treads and risers.

In Fig. 10 is shown a detail of the topmost rung and the terminal portion of the strips 1a, 1a. Here it is shown that the topmost rung 22 is permanently located in and near the extremity of the strips 1a, 1a which at this point are provided with openings 23 through which the topmost rung 22 is placed, instead of being attached to the plates 2c, 2c or being movable therealong. This top rung 22 is longer than the others and projects beyond the strips 1a, 1a to the outside and affords an anchorage for the half length plates 2d, 2d to become permanently attached at the top of the ladder. An eye 27 formed in the one end of each plate 2d, 2d causes the rung 22 to act as a hinge pin on which the plates 2d, 2d turn as a pivot while folding.

The lower extremities of the strips 1a, 1a enter the top of a compartment 5c similar to that shown in Figs. 4, 5 and 6, passing through openings provided in the top or platform 5d for the purpose. As in the case of the former receptacle 5b the present one 5c is provided with the same winding and control mechanism. When the strips 1a, 1a are coiled on the drums in the compartment, the plates 2c, 2c are folded down one upon another on top of the receptacle. During the movement downward of the ladder L the lowest plates 2c are the first to fold and as the winding continues folding of the pairs of plates 2c, 2c connected by each rung 19 follows successively, as long as the winding continues. Through this arrangement of parts only the bottommost plates collapse, while those above remain in extended position in combination with the longitudinal strips until each pair successively reaches the bottom. This makes it possible to arrest and maintain the ladderlike superstructure at any desired height within its range. The elevation as chosen is maintained by the clasp of the chains 14, 14 as shown in Figs. 4, 5 and 6. However, other suitable control means may be employed. The movement up or down in altering the length of the ladder is made possible by releasing the clasp of the chains to the extent that will permit rotation of the drums 9, 9.

Fig. 9 shows the storage compartment as suspended by trunnions 25 borne by supports 26, by means of which the compartment and the ladder structure L may be tilted sidewise in either direction, in the manner indicated by the extra ladder superstructures L1 and L2 shown in leaning position on opposite sides of the ladder L shown in the vertical and connected to the compartment 5c. This arrangement permits using the ladder L in the way common with ordinary rigid wooden ladders.

On one of the trunnion extensions 25 is mounted a segment of a worm gear 27. Beneath the gearing is a worm 28 meshing therewith. This worm is mounted on shaft 29, which is supported by bearings 29a mounted beneath the body of the truck T.

It is to be noted that the ladder L of the above description has numerous advantages over ordinary rigid wooden or metal ladders. Being mounted, as it is, on the truck T and collapsible into such a small condensed space, it can be drawn through congested areas, such as in warerooms, or through narrow aisles between machinery and fabricated parts, or into elevators for use on different floors.

The structure illustrated in Figs. 13 to 20 inclusive, is a further modification of the present invention and provides for a wider range of usefulness, being applicable to employment as tall ladders, observation towers and large units of many kinds. Similar structures may be employed in horizontal positions to span obstructing terrain or to bridge streams, and in many other ways.

As in the previously described structure, the collapsible structure X of Figs. 13 to 20 is dependent upon similar components such as non-planar strips and a series of folding laterals arranged in zigzag relationship over the extended superstructure which forms the variable portion of the mechanism.

In Figs. 13 to 19 inclusive, the non-planar strips 1b, 1b, 1b are arranged in triangular formation, with the convexed surfaces thereof facing inwardly to form a hollow triangular composite column 30. The adjacent edges of the strips 1b, 1b are held in close contact, being drawn and held together by rigid lateral bracing members 31, pivots 32, and rung parts 33 to form a triangular enclosure for the assembled strips 1b, 1b, 1b.

The present structure is characterized, furthermore, by the arrangement of the main portions 34 of the rungs, intermediate the columns 30, 30 to form part of the system of lateral bracing to prevent swaying of the superstructure X when heavily loaded or subjected to wind stresses.

Figs. 13 to 19 illustrate a condition wherein most of the superstructure X is drawn down into storage, with only a small portion extended. Figs. 13a and 14a disclose an additional portion in extended position as indicated by broken lines.

The rigid stationary framework F, acting as the foundation for the moving parts, consists of two main uprights 35, 35 which extend from the top to the bottom of the frame. Situated at the bottom and at right angles to the uprights is a bed plate 36, which is attached to the uprights 35 by means of angle bars 37 and 38. Above the bed plate 36 and parallel thereto is a platform 40. The platform 40 is attached to the main uprights 35 by means of angle bars 41 and 42, which firmly brace it thereto.

Near the front edge of the platform 40 two vertical posts 50, 50 rise at right angles thereto, parallel to the uprights 35. The posts 50, 50 are attached to the platform 40 and braced from side to side by means of four stationary tubular rungs 52, which are held tightly between and against the posts 50, 50 by tie rods which pass through the interior of the rungs and through the posts, and have threaded ends with nuts by means of which they are securely clamped.

The posts 50, 50 are further braced by diagonal bars 51, 51. The tubular rungs 52, 52 being stationary serve to surmount the framework F in reaching the rungs 34 of the extensible portion X of the structure.

Mounted on the main uprights 35, 35 are single bearing blocks 53, 53 and double bearing block 54, which support shafting 55, 56 and 57. Mounted on shafts 55 and 56 are sprocket wheels 58, 58. These sprockets are keyed to their respective shafts and are connected at each side of the structure F by sprocket chains 60, 60. Mounted on shaft 55 are two cylindrical drums 59, 59 the purpose of which will be given further on. As will be seen, the sprocket chains 60, 60 insure the rotation of shafts 55 and 56 in the same direction and at the same rate of speed.

As will be seen by reference to Figs. 13 and 15 the rungs 34, 34 with their respective prolongations 33, 33 extend across the entire distance between the composite columns 30, 30 and a distance beyond them at either side, with protruding ends 61, 61 lying immediately adjacent the inner sides of sprocket chains 60, 60. Attached to the inner sides of each chain 60 are four blocks 62. These blocks extend inwardly from the chains 60 to intercept the ends 61, 61 of the rungs 34. These blocks 62 are shaped as a fork, the interior of the fork being of a shape similar to the teeth of the sprocket wheels 58 and are of a size to fit over the rung-ends 61, 61.

When upward movement of the expansible superstructure X begins, the ends 61, 61 of the uppermost rung 34 are seated in opposite blocks 62, 62 of the chains 60, 60 which are then stationed horizontally opposite the shaft 55 or the shaft 56, as the case may be. The position of the blocks along the chain are just equal to the distance between adjacent rung-ends 61, 61 when these are expanded fully in clasping the triangular columns 30 of strips 1b, 1b, 1b. Each chain 60 carries four of the blocks 62, making its total length a multiple of the distance between centers of the rungs 34.

In the starting position any rotation of the sprocket wheels 58, in a counterclockwise direction, will draw the chains 60, 60 upwards in the direction of column expansion, and will pull with them the rung ends 61 held in their forks. As each rung 34 reaches a position opposite the shaft 55, the sprocket chains 60 begin to recede and disengage the block 62, 62 from the rung-ends 61, 61. At the same time the ends 61 of the next rung 34 following have become seated in the forks of the next pair of blocks 62 which at that moment arrive at a position horizontally opposite shaft 56. As the shafting continues to rotate, the topmost rung 34, being released, climbs above the framework and at the same time the following rung, being engaged in another set of blocks 62, 62 will proceed to rise in the same order as did the preceding rung.

As the rungs 34 are successively moved upwardly the strips 1b, 1b, 1b are assembled and embraced by the bracing links 31, 31 to form the columns 30, 30 and the columns 30, 30 are, in turn, extended above the framework F.

The shaft 56 projects beyond the double bearing block 54 and is provided on this projection with a spur gear 65, which is keyed to the shaft. Below the shaft 56 is the shaft 57 which revolves in the double bearing block 54. The outer end of the shaft 57 is squared to receive a crank 68 (shown in broken lines). Between the squared end of the shaft 57 and the bearing block 54 is secured a pinion 67, which meshes with the spur gear 65 on the shaft 55. By employing the hand crank 68 one may rotate the system of gears, sprockets, chains and blocks to move all parts simultaneously in whatever direction may be desired. By this means the various movements of the whole superstructure are coordinated.

In Figs. 13, 14 and 16 the retracted elements are shown in the lower part of the framework F. The bracing elements 31, 31 are shown as folded down, the bottom ones resting on top of the platform 40 while the strips 1b, 1b are coiled at 70, 70, beneath the platform 40. To reunite these elements into the composite columns 30, 30 all that is necessary is to rotate the shafting above so that the sprockets 58, 58 move in a counterclockwise direction, whereupon the elements are withdrawn from their storage positions and enter the formation in orderly succession, and the structure grows to whatever degree in height is desired.

To return the elements to their respective locations in the spaces reserved for storage when out of use, one moves the control system in the opposite direction, whereupon the bracing elements 31, 31 fold up on top of the platform 40 and the strips 1b, 1b pass down into their respective coils beneath the platform 40.

After obtaining the correct spacing between any two adjacent rungs 34, 34 it is desirable of course, to maintain this distance undisturbed. To insure the preservation of this space during use of the structure X a device in the form of a toggle brace 71—72 is interposed between adjacent rungs 34, 34. These toggle devices are shown in the several Figures from 13 to 19 inclusive. The toggle arms 71—72 are mounted on the rungs 34 in the front of the triangular columns 30, 30 formed by the strips 1b, 1b, 1b at that position on the rung designated as 33. The mounting of these arms on the rungs 34 is such as to provide a hinged effect on which the arms can swing. These arms 71 and 72 are hinged at their other ends to each other by a rivet 73.

The detail construction of the toggle arms 71—72 is best obtained from the enlarged drawings of Figs. 16a, 17, 18 and 19. The toggle arm 71 as viewed from the front in Fig. 19 is seen to consist of two similar bars 71a and 71b. These bars are shown as being divergently bent in such a manner as to spread apart to join the rung 34 above at each side of the center of the portion 33 thereof. The arm 72 is shown as being much narrower and descends from its joint with arm 71 down to the next lower rung 34 at the center point of the section 33 or midway between the legs of the arm 71. When viewed from the side, as shown in Figs. 16a and 18, these arms 71 and 72 are seen to have a crooked formation, the utility of which is best understood by first observing the operation shown in Fig. 16a where, in being drawn from the storage position, the toggle arms rise simultaneously with the rise of the opposite braces 31, 31. On rising, the toggle arms 71—72 finally reach the limit of their combined span, which is the total overall distance of both arms. This total overall distance coincides with the proper distance between centers of adjacent rungs 34, 34. When this ultimate spread of the arms 71—72 takes place the rungs 34 on which the arms are pivoted are substantially opposite the shafts 55 and 56 and are in the position shown by the broken lines in Fig. 18. Also, at this point the upper arm 71 comes in contact with the circular drum 59. Further movement upward of the structure X results in the arm 71 being forced toward the adjacent triangular column 30. In passing toward the column 30 the linkage 71—72 must pass a position where all three joints 34, 73 and 34 are in direct line, i. e. a "dead center." The passing of the "dead center" by the intermediate pivot 73 is made at the expense of a slight straining of the bracing 31, 31 and rungs 34, 34 against the resilient column 30 composed of strips 1b, 1b, 1b.

On having passed the "dead center" the reaction of the resilient material forming the column 30 is such as to throw the arms 71—72 inwardly to stop in contact with the concaved surface of the front strip 1b of the column. This final position is indicated by full lines Fig. 18. It is perhaps unnecessary to state that in this position the arms are safe from any tendency to be dislodged due to the necessary strain required to return the pivot 73 past the "dead center" and thus the adjustment of all parts which make up the columns 30 in that locality is assured.

Where the toggle arms 71 and 72 are attached to the rungs 34 their positions thereon are maintained by sleeves, 74, 74, which are disposed around the rungs 34, 34 to act as separators to keep the arms 71—72 in proper place. Furthermore, in this connection, the possibility of altering the straddle of arms 71, by using sleeves of different length, lends itself to obtaining a fine degree of the overall distance of toggle-span, since the length of arm 71 may be altered, as needed, simply by changing the distance between the legs 71a—71b thereof and holding them secure by an alteration in the lengths of the separators 74, 74. The significance of this lies in the importance of obtaining just the right amount of strain or "squeeze effect" from the toggles when passing the "dead center" in their movement to and from their position of rest against the column 30. Obviously, both arms, 71 and 72 may be made with a straddle in case it is necessary to insure both arms being of equal length.

In order to preserve the structure X at any chosen degree of extension, although weighted with a load which might tend to carry the columns 30 downwardly, a device in the form of a pawl 75 is provided and which is hinged to block 76, supported on main upright 35 of the framework F. When it is desirable to maintain the extension of the superstructure X at any particular height within its range, the pawl 75 is dropped into the hollow between the two of the teeth of the sprocket 58 which happen to be adjacent thereto. By preventing rotation of the sprocket 58 and the connected system of control, the elevation of the superstructure X, as thus established, is maintained until the pawl is again lifted.

When it becomes necessary to shorten the extension of the superstructure X it is necessary to force the toggle arms 71—72 out of their secure position against the surface of the column 30, and in so doing pass the dead center point, described above. For this purpose a special wedging device is designed to force the arms forward and away from the column, and past the "dead center" point.

Fastened to the platform 40 is a bracket 77, which supports a post 78. The post 78 rises directly in front of the triangular column 30 composed of the strips 1b, 1b, 1b. This post rises up between the front strip 1b and the vertical row of rungs 34 stored adjacent thereto, as shown in Fig. 16. At the upper extremity of the post 78 an antifriction roller 79 is located. The front surface of the roller 79 comes in contact with the lower end of the arm 72. Below the first roller 79 is another roller 80 which projects back into contact with the surface of the strip 1b of the composite column 30.

Fastened to the bed-plate 36 is another post 81, which rises inside the hollow triangular column 30 formed from strips 1b, 1b, 1b. This post terminates at a point just below the terminal point of post 78. Crowning the top of the post 81 is a casting ending in a fork which serves as a support to a roller 82 positioned directly opposite and acting to back up the pressure from the roller 80.

The device thus described operates to wedge out the toggle arms 71 and 72. When, in moving downward, a rung 34 arrives opposite the roller 79 on the end of post 78, it brings the lower end of the arm 72 into contact with the roller 79. Further movement downward causes the roller 79 to wedge in between the arm 72 and the strip 1b, pushing out on the arm 72 until it forces the pivot 73 out and past the "dead center". Having passed the dead center it will assume a position from which further force from above will cause the linkage 71—72 to fold down into the storage space provided.

The thrust resulting from the wedging action just described is transferred through the strip 1b to the roller 82 which, by reason of the heavier construction of the post 81, is able to absorb the force, where the post 78 or the strip 1b would be unable to do so.

In order to prevent the wedging action from forcing the line of rungs forward out of their proper line, guide bars 83, 83 are installed in front of rungs 34, 34, adjacent one edge of each composite column 30. Each guide bar rises from the platform 40 to which it is fastened and terminates at the top of the frame-work F. These bars are braced to columns 50, 50 by the diagonal bracing 51, 51.

The mechanism for storing the strips 1b, 1b, 1b when not in use, all lie between the platform 40 and the bed plate 36. When, during the process of reducing the height of the superstructure X the strips 1b, 1b, 1b, are forced down, they pass through triangular holes in the platform and, in moving below the platform 40 come in contact with drums 85, 85, 85 to which they are attached. Due to the pressure from above the strips 1b, 1b, 1b flatten out transversely and coil about their respective drums, being guided by pressure rollers 86, 86, 87 and 87 which bear on the periphery of the drums and their coils.

The non-planar strips 1b, 1b, 1b have an inherent degree of longitudinal stiffness which resists bending of the strip into a coil. Such bending can not occur until some force is applied to flatten out the transverse concavo-convex shape, whereupon the strip will readily bend and assume a curvature approximately equal to that of the arc of the original transverse bend of the strip in its normal state. Owing to the tendency of the strip 1b to resume its normal shape the reel-drums 85 must be provided with means to hold the strips in coiled formation. Furthermore, since, in winding, the coils increase in diameter the pressure provided must be of a resilient nature to accommodate the change in size of the coils. The means shown consist of the cylindrical reel-drums 85 to which the ends of strips are attached. The reel-drums 85 are supported by rollers 88, 88 and 89. The rollers 88, 88 and 89 are supported in permanent position on supports 90 and 91 while the pressure rollers 86 and 87 are supported in the ends of arms 92, 92. These arms fulcrum from shafts 93, 93 which are supported from the platform 40 above, by means of hangers 94.

At the free end of each arm 92 is a pin 95 which projects therefrom and which provides an attachment for the end of a helical spring 96. The springs 96 are arranged at either side of the drums 85 to connect the arms 92, 92 located on top and back of the drums. The tension of each pair of springs 96, 96 is sufficient to overcome the tendency of the strips 1b, 1b to spring out of the coil or otherwise get out of control. As the coil increases or diminishes in diameter the springs 96 stretch or contract to accommodate the changing distance between rollers 86 and 87. As the positions of rollers 88, 88 and 89 are fixed, the entire change is reflected in the spring controlled rollers 86 and 87 Each drum 85 being held in place by the five rollers 88, 88, 89, 86 and 87, accommodates itself to a changing center position during the winding or unwinding of the strip 1b.

The strips 1b, 1b change in width in bending, from the chords of the arcs of their concavo-convex shapes to the total widths of the ribbons of which the strips are formed, because they assume a straight cross-section wherever a bend in a longitudinal direction occurs. Therefore, a triangle formed from the width of the strips in coils below platform 40 must be substantially greater than the triangle formed by the column 30 above the platform where the strips are assembled together in their non-planar, or concavo-convex shape. Owing to their longitudinal rigidity, it is impossible to lead the strips 1b down from their close formation above to a larger triangular formation below. But since the strips may be twisted even while in their non-planar shape, provision has been made whereby, with a slight twist, turning about the center line of each strip enough room is made for the increased width at the point where the strip joins its winding drum. This is accomplished by locating the winding drums 85, 85, 85 at the necessary angles to maintain the proper degree of twist. The relative positions of the strips above the platform 40 and the widened strips below the platform, at the coils, is illustrated in the diagram shown as Figure 20.

Figure 3:
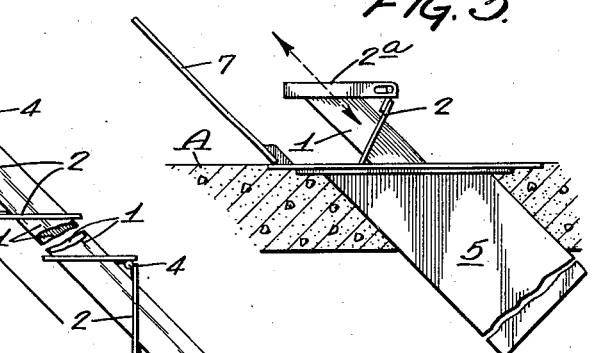
Fig. 3 is a side view illustrating the upper portion of the stairway emerging from a receptacle provided beneath the lower floor surface for storing the collapsible stairway when not in use.
Figure 3A:
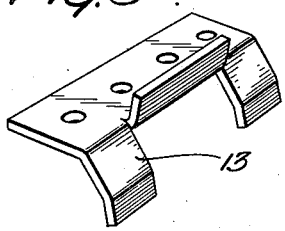
Fig. 3a is a perspective view of a detail of the invention.

When the structure of Figs. 4, 5 and 6 is placed in the receptacle 5 of Figs. 1 and 3, the control lever 17 may be shortened and engaged, outside the wall of the compartment 5b, by the short end 117a of a lever 117 which may be pivoted, intermediate its ends, to said wall at 118. The long end 117b of the lever 117 may have one end of a pull rod or cable 119 attached thereto to extend upward to a convenient point of operation adjacent the floor A, whereby, upon opening the trap door 7 the element 119 may be actuated to operate the control lever 17 for raising the staircase S.

From the foregoing description of the various forms of the invention it will be clear that in each instance the rigid cross members, i. e. the step plates 2, rungs 19 or 119, as the case may be, while serving as a means for ascending and descending the extended structures S, L or X, primarily unite the plurality of composite columns of the structure in a manner to integrate the entire assembly of parts into a single unitary structure; that in increasing and decreasing the length of the unitary structure beyond the storage spaces for the various parts thereof, the parts assembled in the extended structure automatically move in concert; and that, except at the extreme outer ends of the main body strips of the columns, the strip embracing and rigid cross members are not attached to the flexible body strips, consequently the body strips and their encircling braces are free to move readily with respect to each other, without obstruction, during full automatic assembling and disassembling of the various parts of the composite column as the structure is extended or retracted.

I claim:

1. A collapsible structure comprising a plurality of laterally spaced composite columns each including a plurality of resilient strips which collectively form the main body of the column, a series of bracing units each including a portion at each of the opposite ends thereof adapted to embrace one of said columns and an intermediate portion rigidly connecting said column-embracing end portions, and means pivotally connecting said bracing units.

2. A collapsible structure comprising a plurality of laterally spaced composite columns each including a plurality of resilient strips which collectively form the main body of the column, a series of bracing units each including a portion at each of the opposite ends thereof adapted to embrace one of said columns in a plane extending diagonally across the column and an intermediate portion rigidly connecting said column-embracing end portions, and means extending in an opposite diagonal direction across each column and pivotally connecting opposite edges of successive bracing units respectively.

3. A collapsible structure comprising a plurality of laterally spaced composite columns each including a plurality of resilient strips collectively forming the main body of the column structure, a series of pivotally connected body braces surrounding said body strips for engagement therewith along extended portions of said columns, rigid cross members connecting predetermined body braces associated with a pair of said columns, and toggle link structures connecting successive pivots of said body braces along one side of each column to retain said body braces in column rigidifying relation to said body strips.

4. A collapsible structure comprising a plurality of laterally spaced composite columns each including a plurality of resilient strips collectively forming the main body of the column structure, a series of body braces surrounding said body strips for engagement therewith along extended portions of said columns, rigid cross members connecting predetermined body braces associated with a pair of said columns and being in the form of step treads formed integral with the body braces connected thereby, and means for tilting said step treads to a predetermined angle relative to the longitudinal axes of correspondingly extended portions of said columns at spaced intervals along said extended portions.

5. A collapsible structure comprising a plurality of laterally spaced composite columns each including a plurality of resilient strips collectively forming the main body of the column structure, a series of body braces surrounding said body strips for engagement therewith along extended portions of said columns, and rigid cross members connecting predetermined body braces associated with a pair of said columns with alternate cross members constituting step treads formed integral with the body braces connected thereby and intermediate cross members constituting risers between one edge of one tread and the opposite edge of the next tread.

6. A collapsible structure comprising a plurality of laterally spaced composite columns each including a plurality of resilient strips collectively forming the main body of the column structure, a series of body braces surrounding said body strips for engagement therewith along extended portions of said columns, rigid cross members connecting predetermined body braces associated with a pair of said columns with alternate cross members constituting step treads formed integral with the body braces connected thereby and intermediate cross members constituting risers between one edge of one tread and the opposite edge of the next tread, and means pivotally connecting the said edges of said risers to the said edges of said treads.

7. A collapsible structure comprising a plurality of laterally spaced composite columns each including a plurality of resilient strips collectively forming the main body of the column structure, a series of body braces surrounding said body strips for engagement therewith along extended portions of said columns, rigid cross members connecting predetermined body braces associated with a pair of said columns, said cross members being in the form of the rungs of a ladder, means connecting said cross members to each other successively and the first of said cross members to extended terminal ends respectively of said columns for spacing said cross members substantially uniformly along extended portions of said columns.

8. A collapsible structure comprising a plurality of laterally spaced composite columns each including a plurality of resilient strips collectively forming the main body of the column structure, a series of pivotally connected body braces surrounding said body strips for engagement therewith along extended portions of said columns, and ladder rungs extending between predetermined body braces associated with a pair of said laterally spaced columns and connected thereto in axial alignment with the pivots joining successive body braces along one side of each column.

9. A collapsible structure comprising a plurality of laterally spaced composite columns each including a plurality of resilient strips collectively forming the main body of the column structure, a series of pivotally connected body braces surrounding said body strips for engagement therewith along extended portions of said columns, ladder rungs extending between predetermined body braces associated with a pair of said laterally spaced columns and connected thereto in axial alignment with the pivots joining successive body braces along one side of each column, and toggle link structures connecting said pivots along said sides of said columns to retain said body braces in column rigidifying relation to said body strips.

10. A collapsible structure comprising a plurality of laterally spaced composite columns each including a plurality of resilient strips collectively forming the main body of the column structure, a series of pivotally connected body braces surrounding said body strips for engagement therewith along extended portions of said columns, rigid cross members connecting predetermined body braces associated with a pair of said columns, and means for engaging successive pivots of said body braces along one side of each column to effect extension and retraction of said column and said cross members.

11. A collapsible structure comprising a plurality of laterally spaced composite columns each including a plurality of resilient strips collectively forming the main body of the column structure, a series of pivotally connected body braces surrounding said body strips for engagement therewith along extended portions of said columns, rigid cross members connecting predetermined body braces associated with a pair of said columns, means for engaging successive pivots of said body braces along one side of each column to effect extension and retraction of said column and said cross members, toggle means connecting said pivots, and means cooperating with said extension and contraction means for locking said toggle means successively as said columns are progressively extended.

12. A collapsible structure comprising a plurality of laterally spaced composite columns each including a plurality of resilient strips collectively forming the main body of the column structure, a series of pivotally connected body braces surrounding said body strips for engagement therewith along extended portions of said columns, rigid cross members connecting predetermined body braces associated with a pair of said columns, means for engaging successive pivots of said body braces along one side of each column to effect extension and retraction of said column and said cross members, toggle means connecting said pivots, means cooperating with said extension and contraction means for locking said toggle means successively as said columns are progressively extended, and means for successively unlocking said toggle means as said columns are progressively retracted.

HIRAM A. FARRAND.